United States Patent [19]
Kolsrud

[11] Patent Number: 6,053,646
[45] Date of Patent: Apr. 25, 2000

[54] KEYBALL

[75] Inventor: Arild T. Kolsrud, Parsippany, N.J.

[73] Assignee: Lucent Technologies, Inc., Murray Hill, N.J.

[21] Appl. No.: 09/126,661

[22] Filed: Jul. 31, 1998

[51] Int. Cl.[7] ........................ B41J 5/06
[52] U.S. Cl. ............ 400/100; 400/472; 400/485; 347/22
[58] Field of Search ............... 347/22; 400/100, 400/472, 485; 361/680

[56] References Cited

U.S. PATENT DOCUMENTS

| | | | |
|---|---|---|---|
| 3,022,878 | 2/1962 | Etal | 400/100 |
| 4,655,621 | 4/1987 | Holden | 400/100 |
| 5,311,210 | 5/1994 | O'Brien et al. | 400/472 |
| 5,486,058 | 1/1996 | Allen | 400/485 |
| 5,541,593 | 7/1996 | Arsem | 341/22 |
| 5,716,149 | 2/1998 | Mensick | 400/472 |
| 5,735,619 | 4/1998 | Myint | 400/472 |

*Primary Examiner*—Edgar Burr
*Assistant Examiner*—Charles H. Nolan, Jr.

[57] ABSTRACT

An input device for inputting data into a computer or a video game is provided. The input device includes two keyballs mounted to a base. The keyballs may be swiveled relative to the base. Each keyball includes a plurality of switches for activation by the finger tips and thumb tips of a typist. By moving the keyballs and pressing the switches, the typist can enter data in a manner which mimics a conventional typing method. During operation, the typist's hands need not leave the keyballs. Therefore, the input device can reduce strains, and the likelihood of injuries such as carpal tunnel syndrome, to the wrists of the typist.

20 Claims, 5 Drawing Sheets

|    | 66  | 67  | 68  | 69  | 70  |
|----|-----|-----|-----|-----|-----|
| 61 | 100 | 100 | 100 | 100 | 100 |
| 62 | 100 | 80  | 50  | 80  | 100 |
| 63 | 100 | 75  | 3.2 | 37  | 100 |
| 64 | 100 | 80  | 80  | 80  | 100 |
| 65 | 100 | 100 | 100 | 100 | 100 |

KEYBALL

FIELD OF THE INVENTION

This invention relates to an input device for supplying data to an electronic device, such as a computer. More particularly, the present invention relates to a pair of ergonomically shaped input devices.

BACKGROUND OF THE INVENTION

A keyboard is a well-known and popular input device for entering data into a computer. FIG. 1A illustrates a common layout for a conventional keyboard 1. The alphabet keys are divided into two sections by a dividing line 2. A left section 3 includes fifteen letter keys, five numeric keys, and various function keys. A right side 4 includes twelve letter keys, five numeric keys, and several function keys. A professional typist only uses the fingers of his left hand to press keys in the left section 3 of the keyboard 1, and only uses the fingers of his right hand to press keys in the right section 4 of the keyboard 1.

While typing, the professional typist always performs the same motion when pressing a specific key. For example, a typist begins with the four fingers of his left hand resting on the "A", "S", "D", and "F" keys, (from the pinky finger to the index finger, respectively), and the four fingers of his right hand resting on the ":", "L", "K", and "J" keys (from the pinky finger to the index finger, respectively). In order to press the "P" key, the typist moves his right hand upward and very slightly to the left, then presses the "P" key with the tip of his right pinky finger. In order to press the "B" key, the typist moves his left hand down and to the right, then presses the "B" key with the tip of his left index finger.

The above typing method has been used by typists for many years and has become an industry standard typing method. Unfortunately, a serious drawback to the typing method, when applied to the conventional keyboard 1, has been the possibility of developing carpal tunnel syndrome in the wrists of the typist. During the conventional typing method, the weight of the hands must be borne by the muscles and tendons of the forearms and wrists. Over the career of the typist, the repetition of typing sessions may cause the typist to develop carpal tunnel syndrome or possibly arthritic complications.

In order to alleviate the problems associated with conventional typing methods on a conventional keyboard, it has been proposed to incorporate a resilient pad in front of the conventional keyboard 1. The resilient pad supports the wrists and forearms during typing. The resilient pad reduces strains on the wrists during typing, and is widely used by typists today. However, it does not completely eliminate the strains and the repetition of typing sessions may still cause the typist to develop carpal tunnel syndrome or possibly arthritic complications.

Several devices have addressed the problems associated with conventional typing methods on a conventional keyboard. As illustrated in FIG. 1B, one device proposes a modified keyboard. The modified keyboard is shaped as a half-cylinder. The half-cylinder shape allows typists to keep their arms close to their bodies and minimizes bending in the wrists while typing. As illustrated in FIG. 1C, another device modifies the relative placement of keys on a keyboard. This modified keyboard is designed so that the key placement corresponds to the natural orientations of the fingertips. As illustrated in FIG. 1D, yet another device splits a keyboard into two components. Each component is mounted to an armrest of a chair, so that typists may support their forearms on the armrests while typing. FIG. 1D illustrates one of the keyboard components mounted to an end of the right armrest.

Each of the modified keyboards of the background art offers some relief to the stresses placed on the forearms and wrists of typists. Unfortunately, the keyboards of the background art are not completely satisfactory, since the typists must still use their wrists to support the weight of the their hands as their fingers move about the keyboard pressing keys. The weight of the hands, in combination with the finger movements of typing, over extended periods of time can still lead to the drawbacks of carpal tunnel syndrome and arthritic complications.

SUMMARY OF THE INVENTION

The input device of the present invention overcomes one or more of the disadvantages associated with the keyboards of the background art. The input is device of the present invention includes two keyballs, upon which the typist rests the palms of his hands. Each keyball has electronic sensors or switches to sense pressures applied by the finger tips and thumb tips of the typist. Each keyball is moveably mounted to a base. A controller monitors movement of the keyball. Depending upon the position of the keyball and the applied pressure of a given finger tip or thumb tip, an input signal is generated for use by an electronic device, such as a computer. Since the palms of the typist's hands rest upon the keyballs at all times, the wrists of the typist need not support the weight of the typist's hands during typing. Therefore, the problems of muscular stress and fatigue associated with typing are reduced.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus, are not limitative of the present invention, and wherein.

DETAILED DESCRIPTION

Figure 1A:
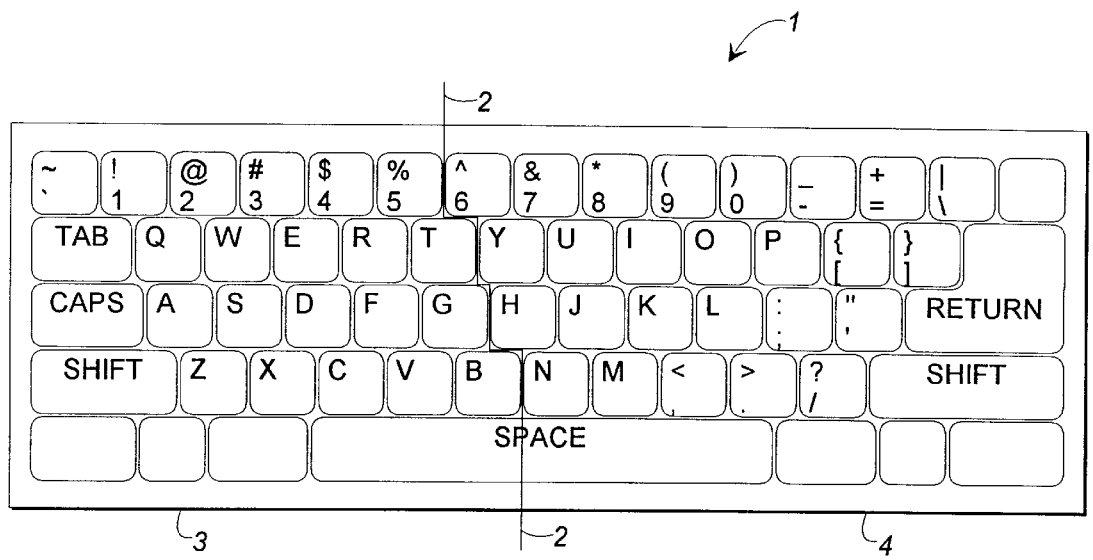
FIG. 1A is an overhead view of a conventional typing keyboard, in accordance with the background art.
Figure 2:
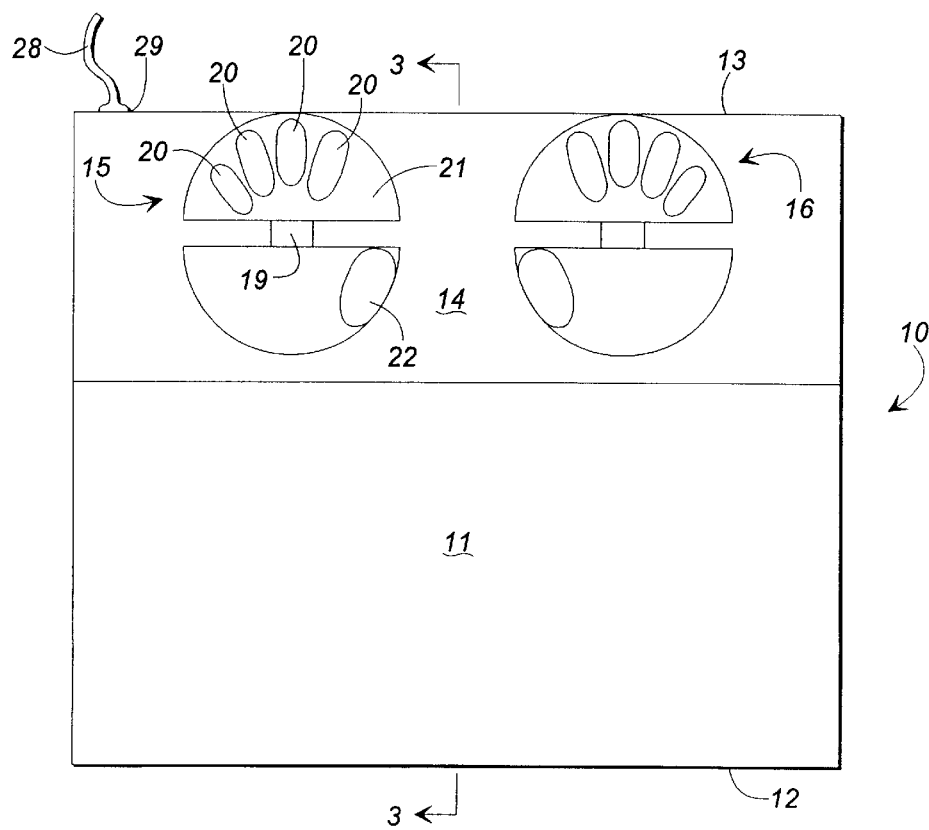
FIG. 2 is an overhead view of an input device, in accordance with the present invention.
Figure 1B:
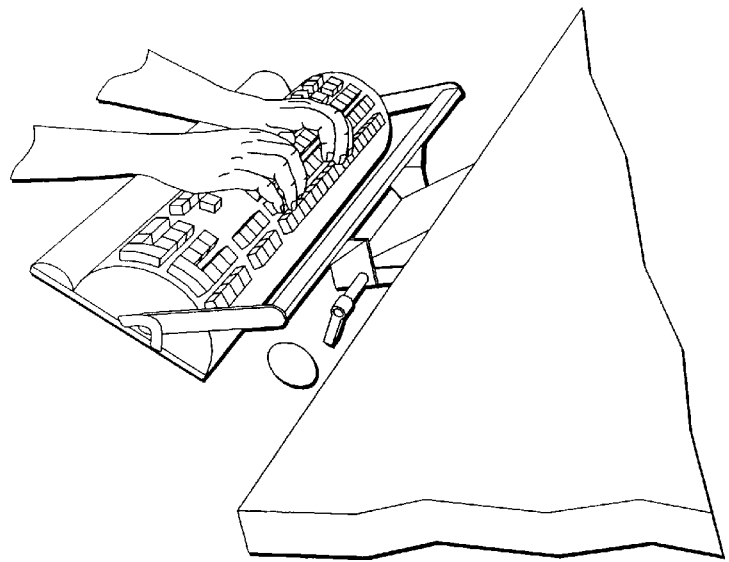
FIG. 1B is a perspective view of a first modified keyboard, in accordance with the background art.
Figure 1C:
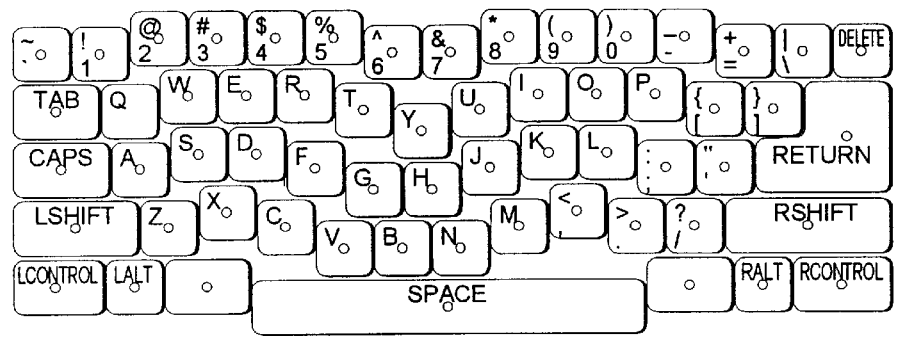
FIG. 1C is an overhead view of a second modified keyboard, in accordance with the background art.
Figure 1D:
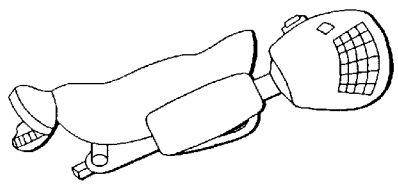
FIG. 1D is a perspective view of a third modified keyboard, in accordance with the background art.

FIG. 2 illustrates the keyball input device of the present invention. A base 10 includes a forearm rest 11. The forearm rest 11 begins at a rear edge 12 of the base 10 and angles upwardly towards a front edge 13 of the base 10 (See FIG. 3). The typist supports his forearms on the forearm rest 11, while using the input device. Preferably, the forearm rest 11 is formed of a foam material. Although the forearm rest 11 is illustrated as presenting a wedge, or angled upper surface, it should be appreciated that the forearm rest 11 could present other upper surface configurations, such as rounded, curved or flat.

The portion of the base 10 adjacent the front edge 13 includes a planar portion 14. A left keyball 15 is attached near a left side of the planar portion 14, and a right keyball 16 is attached near a right side of the planar portion 14. The left keyball 15 and the right keyball 16 are frames, which are approximately shaped as half spheres, and are mirror images of one another.

Figure 3:
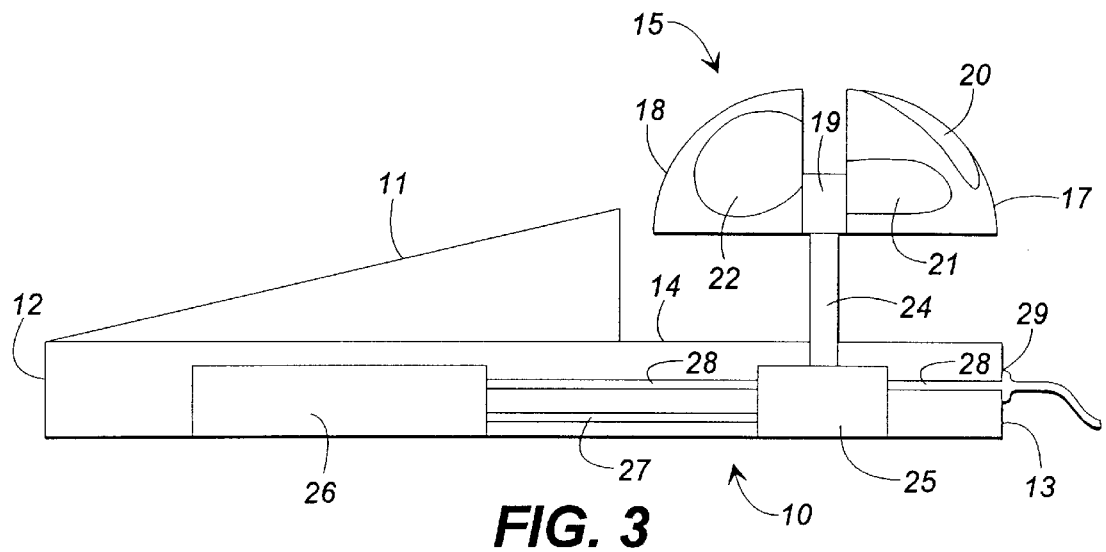
FIG. 3 is a cross sectional view taken along line 3—3 of FIG. 2.

As illustrated in FIG. 3, the left keyball 15 has a forward portion 17 and a rearward portion 18. The forward portion 17 is connected to the rearward portion 18 by an adjuster link 19. The adjuster link 19 permits adjustment of a distance between the forward portion 17 and the rearward portion 18. This adjustment enables the left keyball 15 to be form-fitted to the typist's left hand. Of course, the forward portion 17 and rearward portion 18 of the left keyball 15 can be formed as a unitary structure, if a "one size fits all" device is desired.

An upper surface of the left keyball 15 is formed of a flexible rubberized material, and includes undulations to accommodate the fingers and thumb of the typist's left hand. Four finger channels 20 and a thumb channel 21 are provided on an upper surface and a side surface of the forward portion 17, respectively. Each channel 20, 21 is an indentation, or impressed portion, formed in the surface of the forward portion 17. The rear portion 18 of the left keyball 15 includes a conical indentation 22 to accommodate the base joint of the left thumb to the left hand of the typist.

Figure 4:
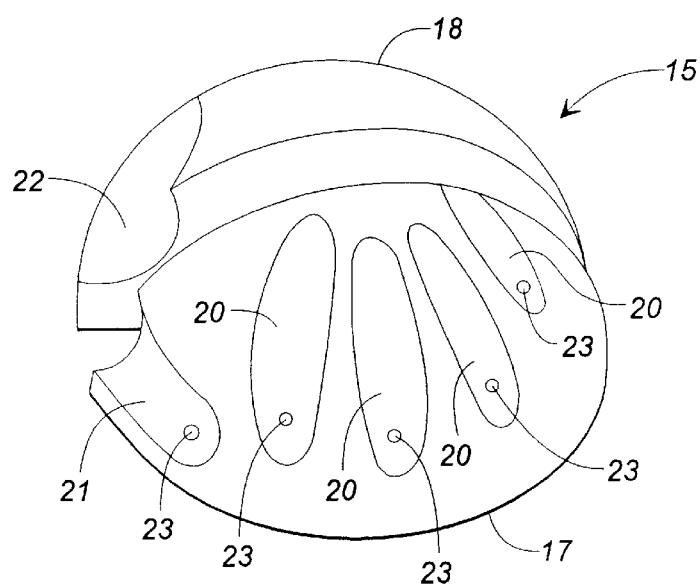
FIG. 4 is a front perspective view of a left-hand keyball of the input device, illustrating microswitches placed at the ends of finger and thumb channels.
Figure 5:
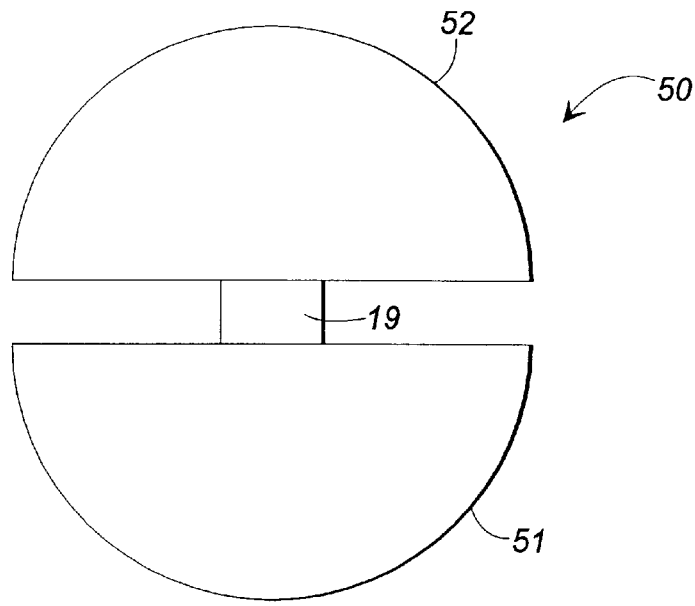
FIG. 5 is an overhead view of a modified keyball, in accordance with the present invention.

As illustrated in FIG. 4, electric switches 23 are provided near the ends of the finger channels 20 and the thumb channel 21. The electric switches 23 are preferably embedded slightly beneath the rubberized material used to form the left keyball 15. Embedding the switches 23 serves to protect the switches 23 from contamination, yet the flexibility of the rubberized material enables the typist to easily activate the switches 23 using only slight finger tip, or thumb tip, pressure.

The left keyball 15 is mounted to the planar portion 14 of the base 10 by a support link 24. The support link 24 has a first end rigidly connected to the adjuster link 19 and a second end passing through an opening in the planar portion 14 of the base 10. The second end is pivotably connected to a movement sensing device 25. A rubber bushing may be incorporated around the opening in the planar portion 14 of the base 10 in order to prevent contaminants from entering into the interior of the base 10, while freely permitting movement of the support link 24 relative to the base 10. The movement sensing device 25 permits a typist to swivel the support link 24 about a vertical axis. The support link 24 is biased to resume a vertical orientation when the typist is not applying a force to the left keyball 15.

The movement sensing device 25 has the ability to sense the movements of the support link 24. The operation of the movement sensing device 25 is analogous to the movement sensors of known joystick controllers. For example, the movement sensing device 25 could employ bubble switches on a printed circuit board, which are mechanically activated by barbs mounted to a planar surface attached to the second end of the support link 24. Alternatively, two connectors on the second end of the support link 24 could be connected to variable resistors within the movement sensing device 25. Alternatively, a planar surface attached to the second end of the support link 24 could have magnets attached thereto, and hall-effect inductive-type sensors could judge the position of the magnets and hence the support link 24.

FIG. 3 illustrates the movement sensing device 25 within the base 10 and judging the movements of the support link 24 relative to the base 10. It should be readily apparent that the movement sensing device 25 could be located within a portion of the keyball 15, and judge the movement of the keyball 15 relative to the support link 24, in which case, the support link 24 would be rigidly attached to the base 10.

The position of the support link 24 is reported to a controller 26, via a signaling bus 27. The signaling bus 27 also reports to the controller 26 which switches 23 of the left keyball 15 have been activated. To accomplish this, the support shaft 24 can be made hollow, so that electrical leads may pass from the electrical switches 23 into the movement sensing device 25 and over to join the signaling bus 27.

The controller 26 processes the electrical signals concerning the positioning of the support link 24 and activation of the individual electrical switches 23, and provides signals to an output bus 28. The output bus 28 extends to the front edge 13 of the base 10 and passes through an opening 29. Ultimately, the output bus 28 is connected to an electronic device, such as a computer or a video game, to facilitate the manual input of data thereto.

The right keyball 16 is structurally identical to the left keyball 15, having only its placement of the structure components located in a mirror symmetrical location. Although the right keyball 16 would have its own movement sensing device, it is preferred that the signaling bus of the right keyball's movement sensing device be joined with the signaling bus 26 of the movement sensing device 25 of the left keyball 15. By this arrangement, only one controller 26 is required.

Now, the operation of the input device will be described. A typists rests his fingers and thumbs in the appropriate finger and thumb channels of the left and right keyballs 15, 16. Typing occurs by swiveling the keyballs and pressing the electrical switches 23. For example, if the typist allows the support link 24 of the left keyball 15 to stay in its biased, vertical orientation, and presses down with the tip of his left pinky finger, such an action will be registered and interpreted by the controller 26 as the input of the "A" key. If the typist allows the support link of the right keyball 16 to stay in its biased, vertical orientation, and presses down with the tip of his index finger, such an action will be register and interpreted as the input of the "J" key. If the typist desires to input the "Y" key, the typist need only move the right keyball 16 slightly upward, toward the front edge 13 of the base 10, and slightly leftward, toward the left keyball 15, and then press down with the tip of his right index finger.

As can be seen from the examples above, typing with the input device of the present invention mimics the same movements which occur when typing on a convention keyboard, as illustrated in FIG. 1. One great advantage of the present invention is the fact that the palms of the left and right hands of the typist never leave the left and right keyballs 15, 16. By this arrangement, the typist is free to rest the weight of his hands upon the keyballs 15, 16, thereby relieving the stress and fatigue normally endured by the wrists of the typist.

The controller 26 can be preprogrammed to interpret the degrees of movement and the respective switches so as to mimic the placement of the various keys of a conventional keyboard, as in the example above. Alternatively, the typist may assign particular keys to particular locations and fingers of the left and right keyballs 15, 16. In this regard, a programming routine would be software initiated. The software would display a particular letter, number, or function on a computer screen, and prompt the typist to move the desired keyball to the desired location and press the desired switch 23 on that keyball in order to establish the key. For example, the computer screen might display the "enter function" and ask the typist to select the desired setup. The typist might then move the left keyball 15 to its rearward and leftward extremes and press the switch 23 associated with the thumb channel 21. The software would accept the input, and uniquely register the combination of the switch and left keyball position as the "enter function."

This programming technique is particularly valuable in the video game field. Often, a computer game will utilize a joystick in combination with various keys of the conventional keyboard to perform certain actions in the game. For example, the "Z" key causes a zoom in view and the "J" key causes the action character to jump. Using a conventional keyboard is awkward during play of the game. The player's attention must be diverted from the screen to determine the location of the appropriate keys needed to perform the desired actions on the screen.

Using the input device of the present invention, the right keyball 16 can be utilized as the joystick, while the left keyball 15 can be utilized as the key input instrument. By software programming, the various keys required by the game can be established at the player's desired finger tips or thumb tip of the left hand. Moreover, the ergonomic feel of the right and left keyballs 15, 16 contributes to the player's satisfaction in controlling the play of the game.

A modification to the input device of FIGS. 2–4 is the inclusion of an additional thumb channel on the left and right keyballs 15, 16. Since the human thumb enjoys greater mobility than the fingers, an additional thumb channel, and its associate switch would permit additional function keys to be assigned. For example, the typist could press the switch associated with an upper left thumb channel while the keyball is in a fixed position to input a certain key, then move his thumb to a lower left thumb channel, while the keyball is in the same position, and press the switch therein to indicate a completely different key.

FIGS. 5–8 illustrate a slightly modified version for the left and right keyballs 15, 16. The modified, left keyball 50 has a forward portion 51 and a rearward portion 52. The forward portion 51 does not have the finger channels 20 and thumb channel 21. The rearward portion 52 does not have the conical indentation 22. Also, no switches 23 are provided in the forward portion 51 of the modified, left keyball 50. In order to sense the pressure from the finger tips and thumb tips, the modified left keyball 50 includes a resistive sensor array 60.

Figure 6:
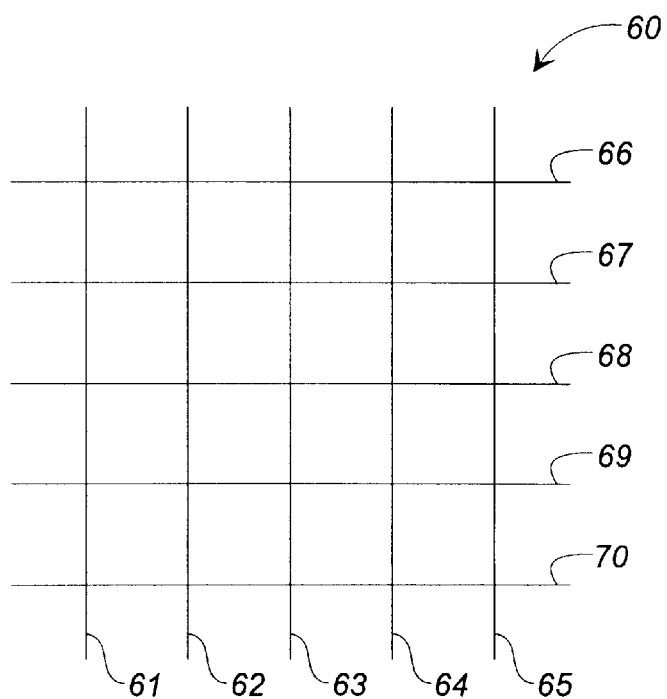
FIG. 6 is an overhead view of a sensor system used to detect finger and thumb pressure in the modified keyball of FIG. 5.
Figures 7, 8:
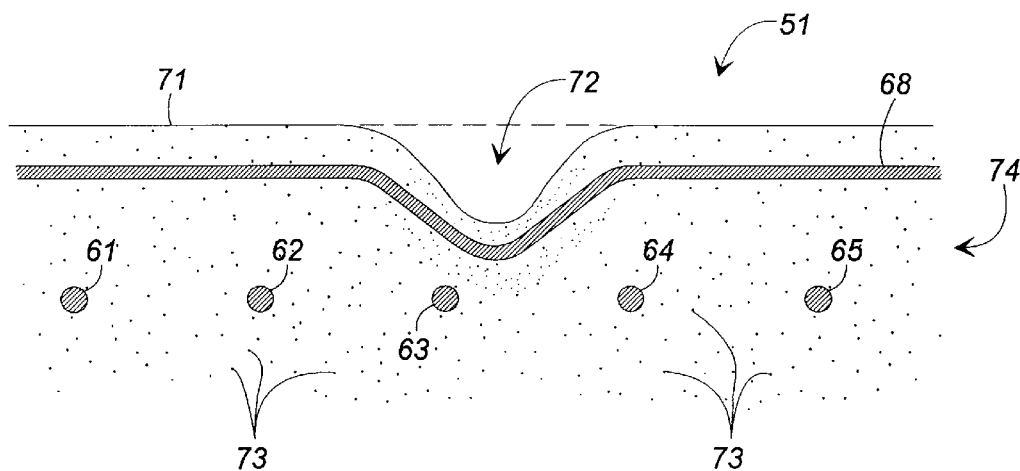
FIG. 7 is a cross sectional view of the modified keyball's sensor system when pressure is being exerted by the finger of a typist.
FIG. 8 is a table illustrating resistance values measured using the sensor system of FIG. 6 when the typist's finger presses on the modified keyball as illustrated in FIG. 7.

As illustrated in FIG. 6, the resistive sensor array 60 includes a plurality of forwardly extending electrical conductors 61, 62, 63, 64, 65 and a plurality of sidewardly extending electrical conductors 66, 67, 68, 69, 70. Referring to FIG. 7, the resistive sensing array 60 is embedded within a carbon-doped, conductive foam material 74 slightly beneath a flexible, rubberized upper surface 71.

FIG. 7 is a cross sectional view illustrating the upper surface 71 of the forward portion 51 of the modified, left keyball 50, The plurality of sidewardly extending electrical conductors 66, 67, 68, 69, 70 are embedded closer to the iupper surface 71 than are the plurality of forwardly extending electrical conductors 61, 62, 63, 64, 65. When the typist presses down on an area of the upper surface 71 of the forward portion 51, an indentation 72 occurs. The indentation 72 causes the carbon particles 73 of the carbon-doped, conductive foam material 74 to be compacted together. Because the carbon particles 73 are conductive, resistance values between several of the forwardly extending electrical conductors 61, 62, 63, 64, 65 and several of the sidewardly extending electrical conductors 66, 67, 68, 69, 70 are influenced.

Each of the electrical conductors is connected to the controller 26. The controller 26 reads the resistive values between each one of the forwardly extending electrical conductors 61, 62, 63, 64, 65 and each one of the sidewardly extending electrical conductors 66, 67, 68, 69, 70. By evaluating the changes in the relative resistive values, the controller 26 can determine the positioning, and intensity of pressures applied to the upper surface 71 of forward portion 51. The controller 26 can even detect if a finger or thumb has slid to a new position on the upper surface 71 of the forward portion 51. The controller 26, in conjunction with its software operating system, has the ability to evaluate the new positioning of the fingers or thumb, and to equate the new positioning with an appropriate input command.

FIG. 8 provides a table of sample resistive values produced by the indentation 72 illustrated in FIG. 7. As shown in the table, the resistive value between the electrical conductor 63 and the electrical conductor 68 has been reduced the most, and the resistance value between the electrical conductors adjacent to their crossing have also been influenced to varying degrees. By evaluating the reduced resistive values, the position of the indentation 72 can be accurately located by the controller 26. Of course, the resistance values of is FIG. 7 are only illustrative. The actual resistance values would vary depending upon the pressure exerted by the finger, and the density of the conductive particles within the carbon-doped, conductive foam material 74.

Once the position of the indentation 72, caused by a finger tip or thumb tip, is located, the controller 26 proceeds to determine the appropriate key input, as discussed above. The advantage of the resistive sensing array 60 is that the typist's fingers and thumb need not be positioned exactly within the finger channels 20 and the thumb channel 21 in order to actuate the input device. This is particularly, advantageous since a "one size fits all" type of arrangement of the finger and thumb channels 20, 21 is not suitable to many typists having unusual sized hands. Also, this arrangement will accommodate typists with handicaps. For example, a typist missing, or having reduced ability, in a particular finger or thumb can still use the keyball. In this instance, the controller 26 will be software reconfigured to supply the various key outputs in relation to the positioning and pressure intensities of the typist's remaining fingers or thumb.

Although FIGS. 6–8 illustrated five electrical conductors crossing, it should be readily apparent that any number of crossing electrical conductors could be employed. The important factors are to cover the area of the upper surface 71 of the forward portion 51 of the modified, keyball 50, and to provide the desired level of resolution as to sensing the location of the finger and thumb tip indentation. Of course, the modified, right keyball would again be a mirror image of the modified, left keyball 50. Although carbon particles 73 are illustrated, other conductive or semi-conductive particles could be employed within the doped, conductive foam material 74. Further, the resistive sensing array 60 could be used with the finger channels 20 and the thumb channel 21 of the keyballs of FIGS. 2–4.

In the above embodiments, the input from the keyball 15 was determined by evaluating the position of the keyball 15 relative to the base 10 when a single switch 23 within a channel 20, 21 is pressed. In an alternative embodiment, the key ball 15 is fixed relative to the base 10, and the movement sensor 25 is not employed. In the alternative embodiment, each channel 20, 21 includes a plurality of switches 23, or the sensor array 60. In a given channel 20, 21, the typist may press any one of the plurality of switches or press in different areas of the sensor array 60 within the channel 20, 21 to input a desired key or finction. Using the alternative embodiment, the typist may use the keyballs 15, 16 to type in a manner similar to the conventional manner by simply pressing against a switch or a portion of the sensor array 60 positioned closest to the conventional placement of the key desired.

Although a hardwired connection from the base 10 has been illustrated for connection to the electronic device, it should be readily apparent that a wireless connection could be formed. In this regard, an IR signaling system, a radio wave transmission system, or any other known system could be used. Further, although the left and right keyballs have been illustrated as being connected to a single base 10, it should be readily apparent that two separate bases could be provided for the respective keyballs.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An input device comprising:
    a base;
    a first support link connected to said base;
    a first frame connected to said first support link; and
    a first switch mounted to said first frame, wherein said first frame is pivotable relative to said base between a first position and a second position, and wherein activation of said first switch signals a first operation when said first frame is in said first position and a second operation when said first frame is in said second position.

2. The input device according to claim 1, wherein said first frame is rigidly connected to said first support link and said first support link is pivotably connected to said base.

3. The input device according to claim 1, wherein said first frame is also pivotable relative to said base to a third position, and wherein activation of said first switch signals a third operation when said first frame is in said third position.

4. The input device according to claim 1, further comprising:
    a curvilinear support surface, for supporting a user's hand, forming an upper surface of said first frame.

5. The input device according to claim 1, wherein said first frame is shaped as approximately half a sphere.

6. The input device according to claim 5, wherein said first frame includes undulations on an upper surface thereof for accommodating fingers and a thumb.

7. The input device according to claim 1, wherein said first switch is an electrical mircoswitch.

8. The input device according to claim 1, wherein said first frame comprises a forward portion, a rearward portion, and an adjuster link, said adjuster link connecting said forward portion to said rearward portion and allowing a distance therebetween to be adjusted so as to accommodate differing sizes of users' hands.

9. The input device according to claim 1, further comprising:
    a second switch mounted to said first frame, wherein activation of said second switch signals a fourth operation when said first frame is in said first position and a fifth operation when said first frame is in said second position.

10. The input device according to claim 1, further comprising:
    a second switch mounted to said first frame, wherein said first frame is also pivotable relative to said base to a third position, and wherein activation of said first switch signals a third operation when said first frame is in said third position and activation of said second switch signals a fourth operation when said first frame is in said first position, a fifth operation when said first frame is in said second position, and a sixth operation when said first frame is in said third position.

11. The input device according to claim 1, further comprising:
    a second electrical switch, a third electrical switch, a fourth electrical switch, and a fifth electrical switch mounted to said first frame.

12. The input device according to claim 1, further comprising:
    a second support link connected to said base;
    a second frame connected to said second support link; and
    a second switch mounted to said second frame, wherein said second frame is pivotable relative to said base between a third position and a fourth position, and wherein activation of said second switch signals a third operation when said second f:me is in said third position and a fourth operation when said second frame is in said fourth position.

13. The input device according to claim 1, wherein said first operation provides a first signal for use by a computer, the first signal being equivalent to a signal indicating a first key of a conventional keyboard, and wherein said second operation provides a second signal for use by a computer, the second signal being equivalent to a signal indicating a second key of a conventional keyboard.

14. An input device comprising:
    a base;
    a first support link connected to said base;
    a first frame connected to said first support link, said first frame having a resilient, flexible material doped with conductive particles formed on a surface thereof;
    a first plurality of electrical conductors embedded in said material at a first depth;

a second plurality of electrical conductors embedded in said material at a second depth; and a controller in electrical communication with said first and second pluralities of electrical conductors, wherein said first frame is pivotable relative to said base between a first position and a second position, and wherein a pressing against the resilient, flexible material in a given spot is interpreted by the controller as a first operation when said first frame is in said first position and is interpreted by the controller as a second operation when said first frame is in said second position.

15. The input device according to claim 14, wherein the controller measures a change in resistance between individual electrical conductors of the first and second pluralities of electrical conductors.

16. The input device according to claim 14, wherein said first operation provides a first signal for use by a computer, the first signal being equivalent to a signal indicating a first key of a conventional keyboard, and wherein said second operation provides a second signal for use by a computer, the second signal being equivalent to a signal indicating a second key of a conventional keyboard.

17. A method of inputting data into a computing system, wherein the computing system includes a base, a first support link connected to the base, a first frame connected to the first support link, and a first switch mounted to the first frame, said method comprising the steps of:

moving the first frame relative to the base to a first position;

pressing the first switch to signal a first operation;

moving the first frame relative to the base to a second position; and pressing the first switch to signal a second, distinct operation.

18. The method according to claim 17, wherein the computing system further includes a second switch mounted to the first frame, said method further comprising:

moving the first frame to the first position;

pressing the second switch to signal a third, distinct operation;

moving the first frame to the second position; and pressing the second switch to signal a fourth, distinct operation.

19. The method according to claim 18, wherein the computing system further includes a second support link connected to the base, a second frame connected to the second support link, and a third switch mounted to the second frame, said method further comprising:

moving the second frame to a third position;

pressing the third switch to signal a fifth, distinct operation;

moving the second frame to a fourth position; and pressing the third switch to signal a fourth, distinct operation.

20. The method according to claim 19, wherein each of the operations is a signal to a computer equivalent to the inputting of a key of a conventional keyboard.

* * * * *